United States Patent
Zhang et al.

(10) Patent No.: US 12,182,226 B2
(45) Date of Patent: Dec. 31, 2024

(54) NEURAL-NETWORK-BASED MAPPING OF POTENTIAL LEAKAGE PATHWAYS OF SUBSURFACE CARBON DIOXIDE STORAGE

(71) Applicant: Microsoft Technology Licensing, LLC, Redmond, WA (US)

(72) Inventors: Qie Zhang, Houston, TX (US); Harpreet Kaur, New Delhi (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 630 days.

(21) Appl. No.: 17/471,601

(22) Filed: Sep. 10, 2021

(65) Prior Publication Data

US 2023/0084240 A1 Mar. 16, 2023

(51) Int. Cl.
*G06F 18/214* (2023.01)
*G01V 1/30* (2006.01)
(Continued)

(52) U.S. Cl.
CPC ............ *G06F 18/2148* (2023.01); *G01V 1/30* (2013.01); *G06F 18/2193* (2023.01); *G06N 3/08* (2013.01);
(Continued)

(58) Field of Classification Search
CPC ... G06F 18/2148; G06F 18/2193; G01V 1/30; G01V 2210/642; G01V 20/00;
(Continued)

(56) References Cited

U.S. PATENT DOCUMENTS 11,079,509 B1 * 8/2021 Tertois .................... G01V 1/325
11,421,521 B1 * 8/2022 Dontsova ................ E21B 44/02
(Continued)

FOREIGN PATENT DOCUMENTS

CN 109945075 A * 6/2019
CN 112487415 A * 3/2021 ............. G06F 21/52

OTHER PUBLICATIONS

Wu, et al., "FaultSeg3D: Using Synthetic Data Sets to Train an End-to-End Convolutional Neural Network for 3D Seismic Fault Segmentation", In Journal of Geophysics, vol. 84, Issue 3, May 1, 2019, 11 Pages.
(Continued)

*Primary Examiner* — Qun Shen
(74) *Attorney, Agent, or Firm* — Alleman Hall & Tuttle LLP

(57) ABSTRACT

The disclosed technology is generally directed to carbon capture and storage. In one example of the technology, a first neural network is trained with synthetic data that is associated with seismic images of synthetic simulated subsurfaces. The first neural network extracts features from multiple resolutions of the seismic images of the synthetic simulated subsurfaces. The ground truth includes synthetic labels that indicate probabilities of potential carbon dioxide leakage pathways of the synthetic simulated subsurfaces. A seismic image of a first subsurface is received. At least the trained first neutral network is used to generate output labels that indicate probabilities of potential leakage pathways of carbon dioxide storage of the first subsurface.

19 Claims, 6 Drawing Sheets

(51) Int. Cl.
  *G06F 18/21*    (2023.01)
  *G06N 3/08*     (2023.01)
  *G06V 30/24*    (2022.01)

(52) U.S. Cl.
  CPC .... *G06V 30/2504* (2022.01); *G01V 2210/642* (2013.01)

(58) Field of Classification Search
  CPC ...... G01V 2210/644; G06N 3/08; G06N 3/09; G06N 3/0985; G06V 30/2504
  See application file for complete search history.

(56) References Cited

U.S. PATENT DOCUMENTS

| | | | | |
|---|---|---|---|---|
| 2009/0320845 | A1* | 12/2009 | Fishman | A61P 25/00 514/250 |
| 2017/0140260 | A1* | 5/2017 | Manning | G06N 3/045 |
| 2019/0326501 | A1* | 10/2019 | Gilbert | C04B 35/45 |
| 2022/0035068 | A1* | 2/2022 | Cheng | G01V 20/00 |
| 2022/0268658 | A1* | 8/2022 | Aechtler | G01J 5/0014 |

OTHER PUBLICATIONS

Wu, et al., "Significance of Fault Seal in Assessing CO2 Storage Capacity and Containment Risks-an Example from the Horda Platform, Northern North Sea", In Journal of Petroleum Geoscience, vol. 27, Issue 3, Jan. 18, 2021, 20 Pages.

Zhang, et al., "FaultNet: A Deep CNN Model for 3D Automated Fault Picking", In Proceedings of the SEG International Exposition and 89th Annual Meeting, Sep. 15, 2019, pp. 2413-2417.

Ligtenberg, "Detection of Fluid Migration Pathways in Seismic Data: Implications for Fault Seal Analysis", In Proceedings of Basin Research, vol. 17, Issue 1, Mar. 1, 2005, pp. 141-153.

"International Search Report and Written Opinion Issued in PCT Application No. PCT/US22/037126", Mailed Date: Oct. 7, 2022, 13 Pages.

Wang, et al., "Inferring CO2 Saturation from Synthetic Surface Seismic and Downhole Monitoring Data using Machine Learning for Leakage Detection at CO2 Sequestration Sites", In International Journal of Greenhouse Gas Control Journal, vol. 100, Sep. 1, 2020, pp. 1-11.

Yang, et al., "Making Invisible Visible: Data-Driven Seismic Inversion with Physics-Informed Data Augmentation", In Repository of arXiv:2106.11892v1, Jun. 22, 2021, pp. 1-13.

* cited by examiner

NEURAL-NETWORK-BASED MAPPING OF POTENTIAL LEAKAGE PATHWAYS OF SUBSURFACE CARBON DIOXIDE STORAGE

BACKGROUND

Carbon capture and storage (CCS) is a process that may be used to capture carbon dioxide (e.g., from an industrial process), transport the carbon dioxide, and store the carbon dioxide. CCS may be used for the reduction of carbon emissions. As part of CCS, the carbon dioxide may be injected deep underground for storage. However, it is possible that carbon dioxide stored underground may leak into the atmosphere through leakage pathways such as faults or fractures.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to carbon capture and storage. In some examples, a first neural network is trained with synthetic data that is associated with seismic images of synthetic simulated subsurfaces. In some examples, the first neural network extracts features from multiple resolutions of the seismic images of the synthetic simulated subsurfaces. In some examples, the ground truth includes synthetic labels that indicate probabilities of potential carbon dioxide leakage pathways of the synthetic simulated subsurfaces. In some examples, a seismic image of a first subsurface is received. In some examples, at least the trained first neutral network is used to generate output labels that indicate probabilities of potential leakage pathways of carbon dioxide storage of the first subsurface.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
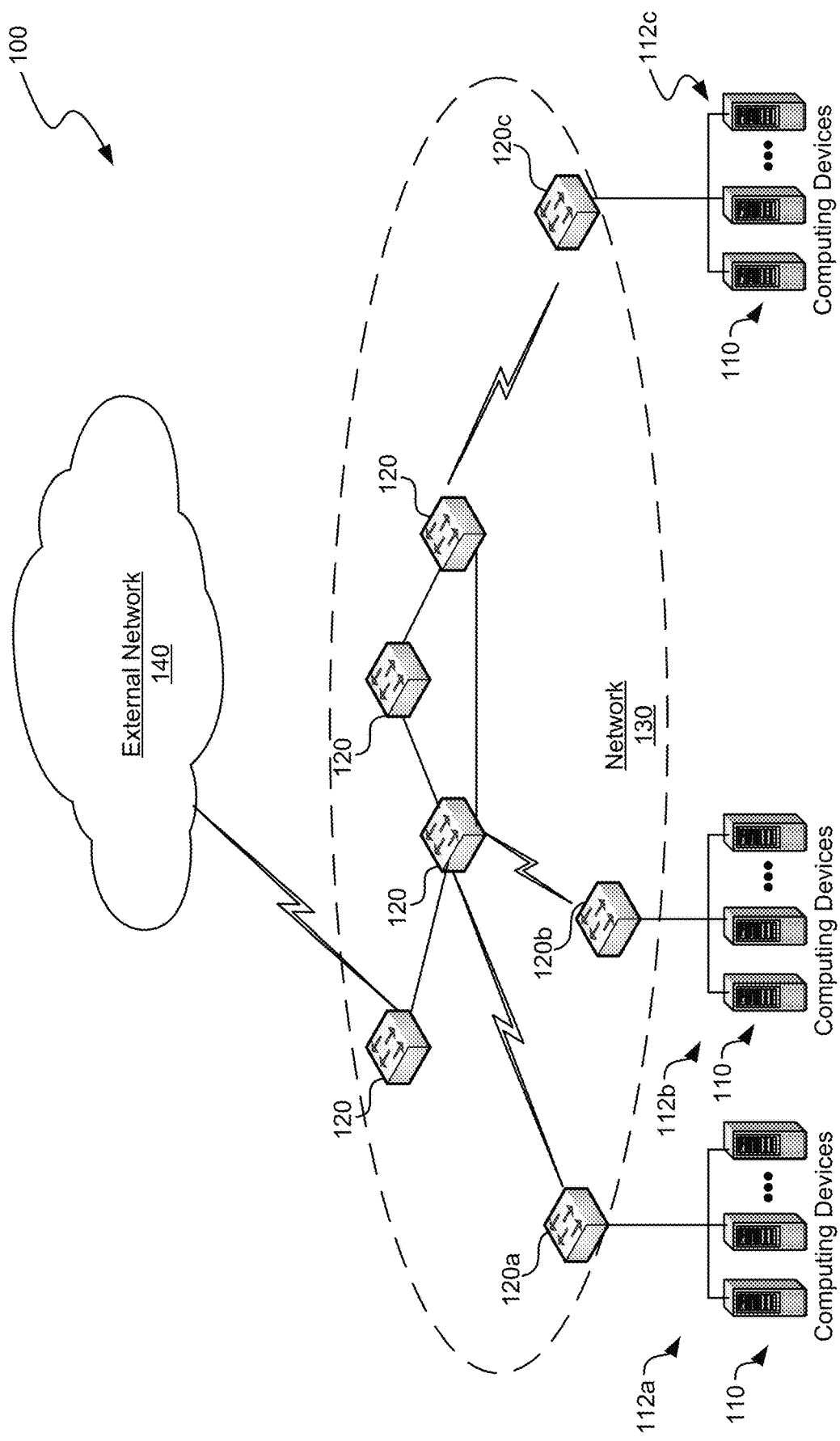
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on," and includes the option of being based on additional factors, some of which may not be described herein. As another example, the term "via" is not exclusive, and is equivalent to the term "via, at least in part," and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "cloud" or "cloud computing" refers to shared pools of configurable computer system resources and higher-level services over a wide-area network, typically the Internet. "Edge" devices refer to devices that are not themselves part of the cloud, but are devices that serve as an entry point into enterprise or service provider core networks.

Briefly stated, the disclosed technology is generally directed to carbon capture and storage. In some examples, a first neural network is trained with synthetic data that is associated with seismic images of synthetic simulated subsurfaces. In some examples, the first neural network extracts features from multiple resolutions of the seismic images of the synthetic simulated subsurfaces. In some examples, the ground truth includes synthetic labels that indicate probabilities of potential carbon dioxide leakage pathways of the synthetic simulated subsurfaces. In some examples, a seismic image of a first subsurface is received. In some examples, at least the trained first neutral network is used to generate output labels that indicate probabilities of potential leakage pathways of carbon dioxide storage of the first subsurface.

In some examples, one or more neural networks is trained to map potential carbon dioxide leakage pathways in a subsurface from a seismic image of the subsurface. In some examples, the training is based on synthetic data. The synthetic data may include simulated seismic images of subsurfaces. The training may also include a ground truth for each of the simulated seismic images. In some examples, the ground truth includes labels that indicate potential carbon dioxide leakage pathways. The potential carbon dioxide leakage pathways may be faults, fissures, or the like for which there is a risk that carbon dioxide can leak. In some examples, the labels may include probabilities of potential leakage pathways of the subsurface carbon dioxide storage including, for example, its caprock and overburden layers.

In some examples, the simulated seismic images may incorporate one or more features that may enable the synthetic data to act as more realistic training data. In some examples, the features may include features that make the potential leakage pathways more realistic, such as by having the potential leakage pathways include, for example, curvatures and/or more complex geometries rather than merely being straight planes. The features may include linear elastic deformations and linear transformations. In this way, the synthetic data may incorporate linear deformations and/or linear transformations.

One or more neural networks may be trained based on the synthetic data. At least one of the neutral networks may be trained based on multiple resolutions of the simulated seismic images used in the training. In some examples, at least two neural networks may be used, each neural network being based on a different model. In some examples, dropout layers are used for some or all of the models of the neural networks. In some examples, dropout layers are used for some or all of the models, effectively providing multiple neural networks for the models during training. In some examples, some or all of the neural networks may be used in order to provide ensemble predictions, combining the prediction of multiple neural networks in order to improve the overall result. After training the neural network based on the synthetic data, the trained neural networks may be tested with real field examples of seismic images of subsurfaces, which may be used to further train the neural networks.

In some examples, calculation of the uncertainty estimation of the output labels is also trained. In some examples, the neural networks are trained so that, for each label that is output, a corresponding uncertainty value associated with the output label is given.

After the neural networks are trained, a seismic image of a real subsurface may be provided to the neural networks. In some examples, the neural networks may output probabilities of potential leakage pathways of the carbon dioxide storage of the subsurface of the input seismic image. In some examples, the neural networks may also output a corresponding uncertainty value for each of the output probabilities.

In this way, the neural networks may be used to, upon being provided with a seismic image of a subsurface, provide automated mapping of potential carbon dioxide pathways of the subsurface. This may be used to aid in assessing a reservoir site for potential use in CCS.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including a local computer, on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is a device that is configured to be part of a process for training and using neural networks to map potential carbon dioxide leakage pathways in a subsurface.

Illustrative Computing Device

Figure 2:
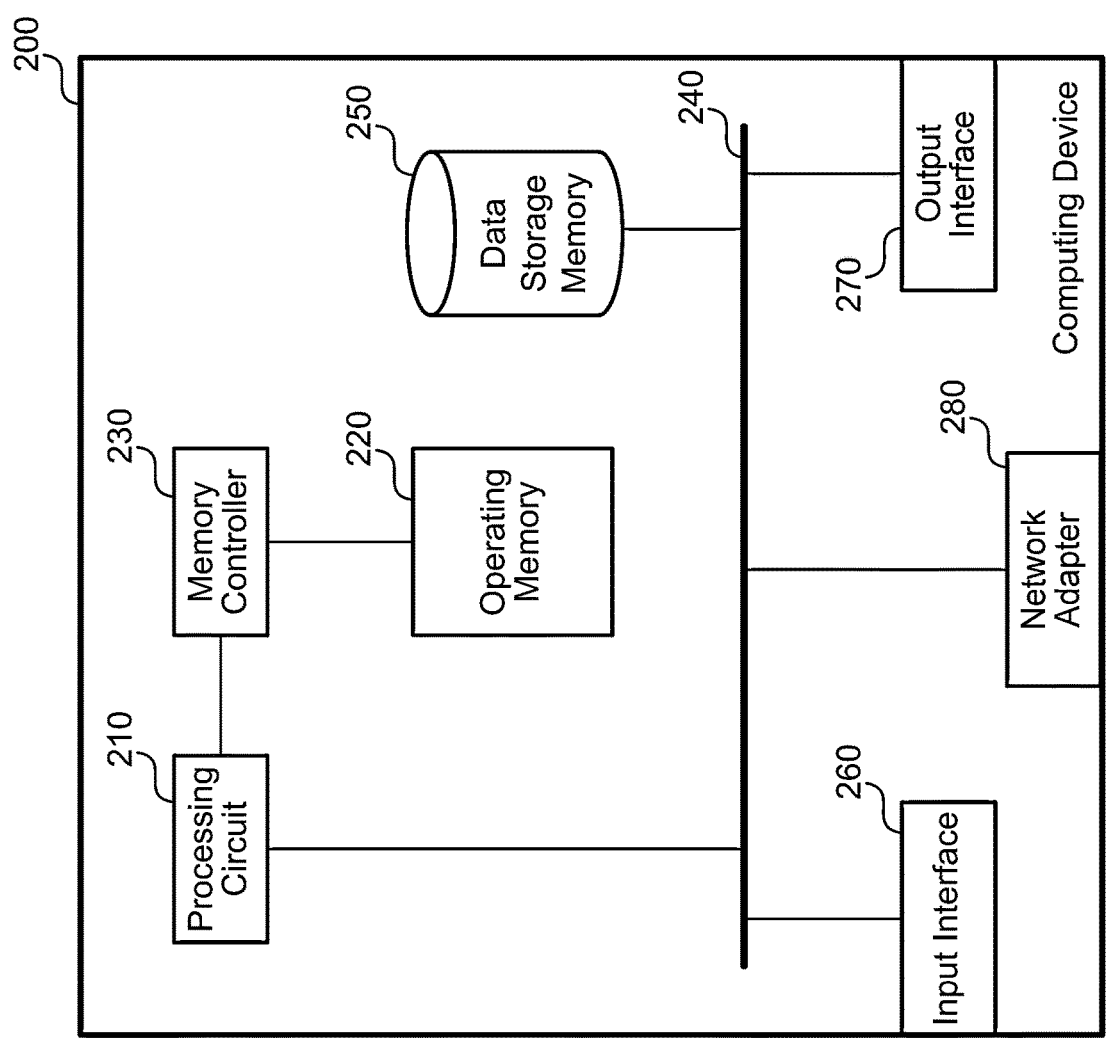
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be a server device such as an application server computer, a virtual computing host computer, or a file server computer, e.g., computing device 200 may be an example of computing device 110 or network node 120 of FIG. 1. Likewise, computer device 200 may be an example any of the devices, a device within any of the distributed systems, illustrated in or referred to in FIG. 3, FIG. 4, and/or FIG. 5, as discussed in greater detail below. As illustrated in FIG. 2, computing device 200 may include processing circuit 210, operating memory 220, memory controller 230, bus 240, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage component 250, e.g., eXecute In Place (XIP).

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D atacked memory, static random access memory (SRAM), magnetoresistive random access memory (MRAM), pseudorandom random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although FIG. 2 illustrates bus 240 as a single passive bus, other configurations, such as a collection of buses, a collection of point-to-point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter (UART), a Serial Peripheral Interface (SPI), Inter-Integrated Circuit (I2C), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long-Term Evolution (LTE) adapter, SigFox, LoRa, Powerline, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Figure 6:
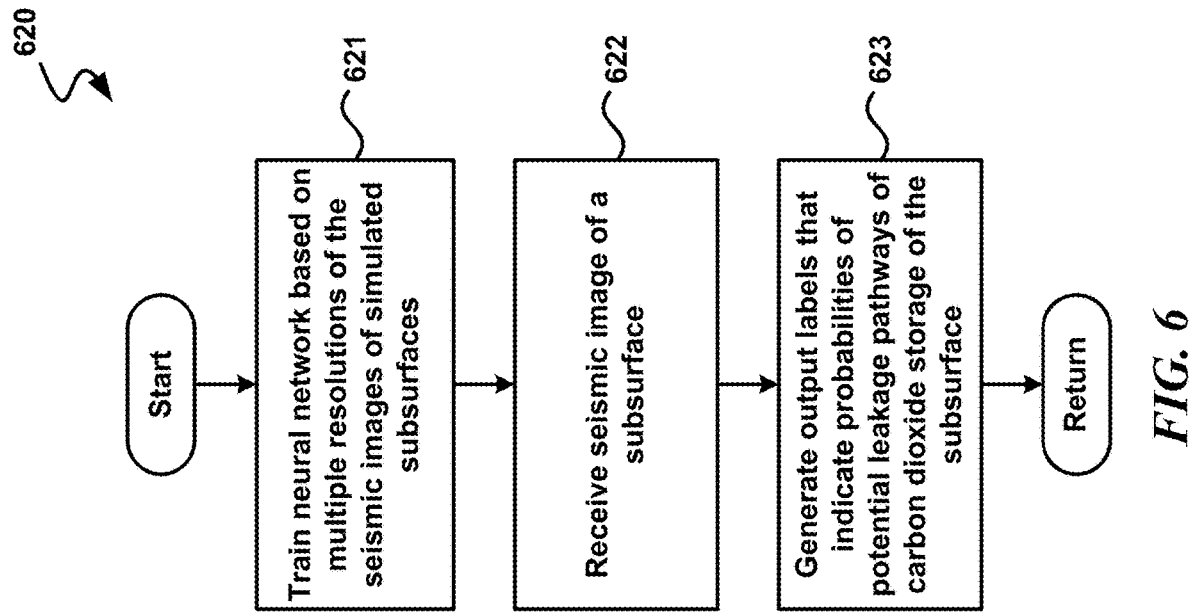
FIG. 6 is a flow diagram illustrating an example process for training and using neural networks to map potential carbon dioxide leakage pathways in a subsurface, in accordance with aspects of the disclosure.

Some examples of computing device 200 include at least one memory (e.g., operating memory 220) having processor-executable code stored therein, and at least one processor (e.g., processing unit 210) that is adapted to execute the processor-executable code, wherein the processor-executable code includes processor-executable instructions that, in response to execution, enables computing device 200 to perform actions, where the actions may include, in some examples, actions for one or more processes described herein, such as one or more of the processes shown in FIG. 6, as discussed in greater detail below.

Illustrative System

Figure 3:
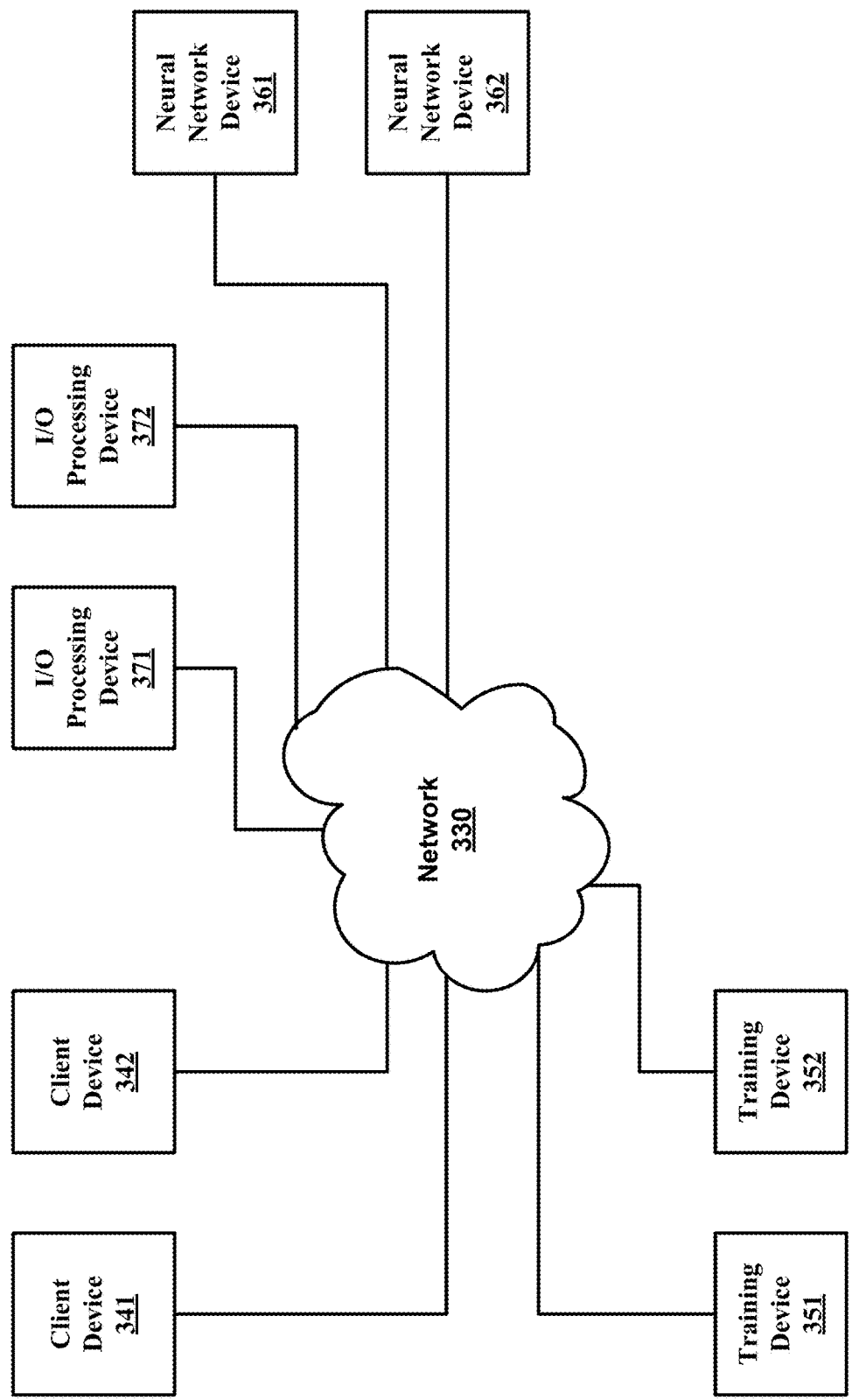
FIG. 3 is a block diagram illustrating an example of a network-connected system.

FIG. 3 is a block diagram illustrating an example of a system (300). System 300 may include network 330, as well as client devices 341 and 342; training devices 351 and 352; neural network devices 361 and 362; and I/O processing devices 371 and 372, which, in some examples, all connect to network 330.

Each of client devices 341 and 342; training devices 351 and 352; neural network devices 361 and 362; and I/O processing devices 371 and 372 may include examples of computing device 200 of FIG. 2. FIG. 3 and the corresponding description of FIG. 3 in the specification illustrate an example system for illustrative purposes that does not limit the scope of the disclosure. In some examples, training devices 351 and 352 are part of one or more distributed systems, neural network devices 361 and 362 are part of one or more distributed systems, and I/O processing devices 371 and 372 are part of one or more distributed systems.

In some examples, one or more neural networks may reside on one or more devices including neural network devices 361 and 362. In some examples, the neural networks may be trained by one or more distributed system that include training devices 351 and 352.

In some examples, a client that is a user of one or more services may make use of a client device such as client device 341 or client device 342. In some examples, a seismic image of a subsurface may be provided by a client device such as client device 341 and/or client device 342. In some examples, an I/O processing system that includes I/O processing device 371 and/or I/O processing device 372 may receive the input seismic image, may optionally perform processing on the input seismic image, and then provide the input seismic image to one or more trained neural networks that may reside in one or more device such as neural network device 361 and/or neural network device 362.

The input seismic image may be a 3D seismic image of a subsurface. The one or more trained neural networks may output a result. The result may include an output 3D images that includes probabilities of potential carbon dioxide leakage pathways of the subsurface in the seismic image. The I/O processing system may then receive the result, may optionally perform processing on the result, and then provide the result in response to the input seismic image of the subsurface.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. In essence, network 330 may include any suitable network-based communication method by which information may travel among client devices 341 and 342; training devices 351 and 352; neural network devices 361 and 362; and I/O processing devices 371 and 372. Although each device is shown connected as connected to network 330, that does not necessarily mean that each device communicates with each other device shown. In some examples, some devices shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown instead communicating with each other with a different network of the multiple networks.

System 300 may include more or less devices than illustrated in FIG. 3, which is shown by way of example only. Also, in some examples, some devices shown as separate devices may instead be a single device that combines the functionality of one or more devices shown in FIG. 3.

Figure 4:
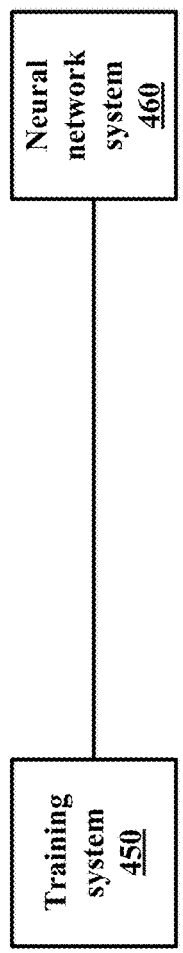
FIG. 4 is a block diagram illustrating an example of a system for training neural networks for mapping potential carbon dioxide leakage pathways.

FIG. 4 is a block diagram illustrating an example of a system (400). System 400 may be an example of a portion of system 300 of FIG. 3. System 400 may be a system for training neural networks for mapping potential carbon dioxide leakage pathways for subsurfaces. System 400 may include training system 450 and neural network system 460. In some examples, training system 450 and neural network system 460 each include one or more distributed systems that each include one or more devices. Although training system 450 and neural network system 460 are shown as separate systems, in some examples, one distributed system performs some or all of both the training functionality and the neural network functionality, rather than being separated into entirely separate systems.

In some examples, one or more neural networks associated with neural network system 460 are trained by training system 450. In some examples, some or all of the neural networks include convolutional neural networks. The neural networks may be trained to receive input seismic images of subsurfaces, and to provide output labels that are associated with potential carbon dioxide leakage pathways of the subsurface for use in CCS. The training may be accomplished with synthetic data that includes an associated ground truth.

The synthetic data used in training may include simulated seismic images of subsurfaces. In some examples, the ground truth includes labels that indicate potential carbon dioxide leakage pathways. The potential carbon dioxide leakage pathways may be faults, fissures, fractures, or the like for which there is a risk that carbon dioxide can leak. In some examples, the labels may include probabilities of potential leakage pathways of the subsurface carbon dioxide storage.

The training of the neural network may be used for applications associated with CCS. In some examples, CCS may be used in an attempt reduce the carbon footprint by capturing carbon dioxide from industrial sources and permanently storing it in the subsurface. Prior to injecting carbon dioxide inside the subsurface reservoir, a detailed assessment of the storage site may be done to map the potential leakage pathways (e.g., faults or fractures) through which there is a risk that stored carbon dioxide may leak back to the atmosphere. Leakage pathways that intersect the storage reservoir may play an important role in determining the seal integrity. Accordingly, determination of potential leakage pathways may be used in the containment risk assessment of a reservoir that is a candidate for carbon dioxide storage in CCS. In some examples, neural networks are trained to output labels that provide information associated with potential leakage pathways of the subsurface carbon dioxide storage at a particular potential site for carbon dioxide storage for CCS.

In some examples, simulated seismic images are used in training the neural networks. Seismic images may be generated by directing an intense source of energy into the ground. Next, receivers may pick up reflected and refracted seismic waves, which may be used to generate a seismic image as a 3D digital of a subsurface. The seismic image may be a greyscale image that shows the seismic property such as seismic reflectivity or seismic impedance at each location of the subsurface of which the image has been taken. Seismic images may generally be used for a variety of purposes, including providing information about subsurface formation including the characterization of subsurface geology, the indirect determination of contaminants, and for exploration of oil, gas, and subsurface fresh water. In some examples of the disclosure, seismic images are used to map potential leakage pathways of subsurface carbon dioxide storage.

In some examples, the simulated seismic images used in training the neural networks may incorporate one or more features that may make enable the synthetic data to act as more realistic training data. In some examples, the features may include features that make the potential leakage pathways more realistic, such as by having the leakage pathways include curvatures or complex geometries rather than merely being straight planes. The features may include linear elastic deformations and linear transformations.

In some examples, synthetic simulations with small elastic deformations may result in training labels which are physically more plausible. In subsurface structures, stress fields generated by various forces can lead to complex deformations, especially along fault planes. Introducing the elastic deformations in the training data may be used to model these realistic variations. In some examples, the deformations are captured in the synthetic simulations for training data so that, during the training, the neural networks learn these realistic case scenarios during training, and accordingly have improved results when trained. Accordingly, the training data may incorporate elastic deformation and/or linear transformations as discussed above.

In some examples, one or more of the neural networks is trained with multiple techniques that cause the model trained by the neural network to be more sophisticated than a relatively simple model. These techniques can include increasing the number of layers, increasing the number of filters, changing the way the filters are behaving, altering the way that features from input seismic images are captured, and/or the like. In some examples, at least one of the neural networks is trained such that features are captured from multiple resolutions of the input seismic image, with the features from the multiple resolutions combined to reach a final result.

In some examples, ensemble learning is used when training the neural networks. In some examples, the training of the neural networks uses a deep-learning-based workflow that combines multiple models to simulate an ensemble learning method for the neural networks. In some examples, the ensemble learning combines the predictions from multiple models rather than using a single model. In some examples, the ensemble learning uses nonlinear relationships described by neural networks and their dependence on different conditions, including weights, resolution and statistical noise in the training labels.

In some examples, the neural networks learn mapping of the input domain to the target domain, and this mapping is of stochastic nature which means that different training instances may lead to a slightly different mapping function from input domain to target domain, which may lead to high variance affecting the performance of the network on validation as well as test data sets. In some examples, this effect may be compensated for by using an ensemble of neural networks and combining the predictions from different networks.

In some examples, an ensemble of networks is created by using multiple different networks that are each trained with different models, and by creating multiple versions of each model using dropout layers. With regard to using different models, the results of a particular model may perform well on some input data and be less accurate than other input data relative to other models.

The use of dropout layers may include producing dropout layers by, for a particular dropout layer, ignoring particular randomly selected neurons. Ignoring a neuron, in this context, may refer to not considering the neuron during a particular forward or backward pass. The use of dropout layers may prevent co-adaptation of neurons by making the training process more robust, and accordingly act as a regularizer. The regularization provided by the use of dropout layers may include, among other things, improving generalization errors and reducing overfitting.

The predictions from ensembles created by dropouts as well as the ensembles created by training multiple networks using different models may be combined to achieve the output result. The results from each of the multiple neural networks may be combined in different ways in different examples. In some examples, the results from the multiple neural networks may be combined by averaging the results from each of the neural networks to obtain the output result. In other examples, the results from the multiple neural network may be combined in other suitable ways to obtain the output result.

After the neural networks have been trained with the synthetic data and its accompanying ground truth, the trained neural networks may be tested with real field examples of seismic images of subsurfaces, which may be used to further train the neural networks.

In some examples, the neural networks are trained not only to obtain labels that provide information associated with potential leakage pathways of the subsurface carbon dioxide storage at a particular potential site for carbon dioxide storage for CCS, but are also trained to also provide an uncertainty estimate associated with each label. In some examples, the neural networks are trained to generate the uncertainty estimate, in conjunction with the training to generate the labels. Epistemic uncertainty may arise in regions with limited data where multiple plausible model parameters can provide information about the underlying ground truth.

In some examples, the uncertainty estimate indicates the confidence or uncertainty that the corresponding output label is correct. The uncertainty value may be used to quantify the confidence on the network predictions and may also be used as an aid in diagnosing errors in the interpretation results. Uncertainty evaluation may be used to determine the samples that are hard to classify by the neural networks and require further analysis by an expert as well as the samples that have a larger deviation from the training data.

In some examples, the uncertainty estimation incorporates Bayesian statistics with a deep ensembling approach with dropout layers to derive the model uncertainty used in the uncertainty estimation. In some examples, a network configuration consisting of dropout in weight layers is used, which is mathematically equivalent to a Bayesian approximation of a Gaussian process. In some examples, during the training of the uncertainty estimation, the uncertainty estimation is tested on different field datasets, which may be used to help to demarcate the high uncertainty regions that can be analyzed in detail at later stages.

Figure 5:
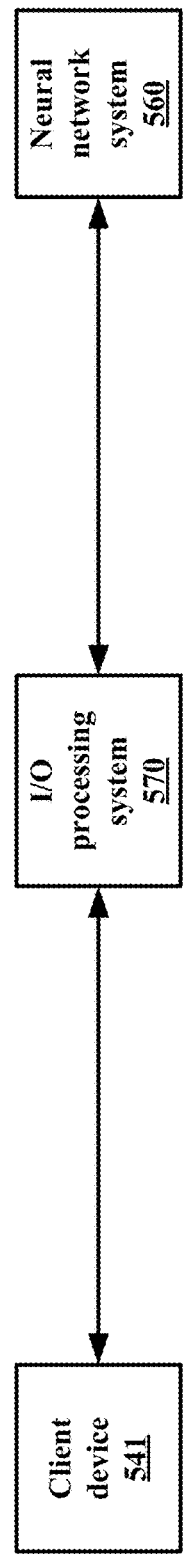
FIG. 5 is a functional block diagram illustrating an example of a system for using trained neural networks to map potential carbon dioxide leakage pathways in a subsurface.

FIG. 5 is a functional block diagram illustrating an example of a system (500). System 500 may be an example of a portion of system 300 of FIG. 3. System 500 may be a system for using trained neural networks to potential carbon dioxide leakage pathways for subsurfaces. System 500 may include client device 541, I/O processing system 570 and neural network system 560. In some examples, I/O processing system 570 and neural network system 560 each include one or more distributed systems that each include one or more devices. In some examples, some or all of the neural network functionality may be included in one or more of the distributed systems that perform I/O processing, rather than being in an entirely separate distributed system.

In some examples, neural network system 560 is a trained neural network system that has been trained as discussed above with regard to neural network system 460 of FIG. 4. Client device 541 may be device used by a user of services. In some examples, the user may be a user of services including services associated with obtaining output labels for an input seismic image provided. In some examples, a user may be a user of a variety of network services, with the ability to obtain output labels for provided seismic images being an additional service that the user may be able to access, in addition to other various network services provided to the user.

In some examples, a user may cause client device 541 to provide a seismic image of a subsurface. The provided seismic image may be a seismic image of a real subsurface (in contrast to synthetic, simulated data as may have been used in training the neural networks). The input seismic image may be received by I/O processing system 570. In some examples, I/O processing system 570 may perform one or more input processing functions on the input seismic image, and then provide the input seismic image to neural network system 560. In other examples, I/O processing system 570 may provide the input seismic image to neural network system 560 without performing any processing on the received input seismic image.

In some examples, neural network system 560 receives the input seismic image from I/O processing system 570. In some examples, neural network system 560 may output labels based on the received input seismic image, and based on the training previously received by the neural networks in neural network system 560, as discussed in greater detail above with regard to FIG. 4. The output result provided by network system 560 may be a 3D image corresponding to the input 3D seismic image, with the output image providing, at each point in the output image, a label that indicates a probability of potential carbon dioxide storage leakage at that point, where a one indicates a definite potential carbon dioxide storage leakage pathway, a zero indicates that there is no chance of a potential carbon dioxide storage leakage pathway at that location. In this way, the output results may provide an output probability distribution. In some examples, neural network system 560 also provides, for each output label, an uncertainty estimation corresponding to the output label.

Neural network system 560 may provide the output result to I/O processing system 570. I/O processing system 570 may perform output processing on the output result, and then provide the processed output result to client device 541. In some examples, I/O processing system 570 may provide the output result to client device 541 without performing any output processing. It may be possible for the user of client device 541 to view the output result in various ways, such as by viewing various cross-sections of the 3D output data.

FIG. 5 shows providing an input seismic image and receiving output results via client device 541. This is one example of a means of providing an input seismic image and receiving output results for illustrative purposes. In various other examples, providing an input seismic image and receiving output results may be accomplished in various other suitable ways.

The user may use the output results received by client device 541 to assist in assessment of the subsurface provided in the seismic image as a potential storage site for carbon dioxide for CCS purposes. The output results may enable increased speed and accuracy in identifying potential hazards for a potential carbon dioxide storage site. System 500 may enable an automation of mapping of potential carbon dioxide leakage pathways, using computer vision to accurately map potential carbon dioxide leakage pathways in the caprock, reservoir section to assist in determining the sealing integrity of the potential storage site for use in containment risk assessment of the potential storage site.

Although seismic images have been discussed herein, in some examples, suitable images of a subsurface other than seismic images may also and/or alternatively be employed.

Illustrative Process

FIG. 6 is a diagram illustrating an example dataflow for a process (620) for mapping potential carbon dioxide leakage pathways in a subsurface for CCS. FIG. 6 and the corresponding description of FIG. 6 in the specification illustrate an example process for illustrative purposes that do not limit the scope of the disclosure.

In the illustrated example, first, step 621 occurs. At step 621, in some examples, a first neural network is trained with synthetic data that is associated with seismic images of synthetic simulated subsurfaces. In some examples, the first neural network extracts features from multiple resolutions of the seismic images of the synthetic simulated subsurfaces. In some examples, the ground truth includes synthetic labels that indicate probabilities of potential carbon dioxide leakage pathways of the synthetic simulated subsurfaces.

As shown, step 622 occurs next in some examples. In step 622, in some examples, a seismic image of a first subsurface is received. As shown, step 623 occurs next in some examples. In step 623, in some examples, at least the trained first neutral network is used to generate output labels that indicate probabilities of potential leakage pathways of carbon dioxide storage of the first subsurface. In some examples, the process then advances to a return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
a device including at least one memory having processor-executable code stored therein, and at least one processor that is adapted to execute the processor-executable code, wherein the processor-executable code includes processor-executable instructions that, in response to execution, enable the device to perform actions, including:
training a first neural network with synthetic data that is associated with seismic images of synthetic simulated subsurfaces, wherein the first neural network extracts features from multiple resolutions of the seismic images of the synthetic simulated subsurfaces, with ground truth including synthetic labels that indicate probabilities of potential carbon dioxide leakage pathways of the synthetic simulated subsurfaces, and wherein the synthetic data includes simulated elastic deformations of the potential carbon dioxide leakage pathways of the synthetic simulated subsurfaces;
receiving a seismic image of a first subsurface; and
using at least the first neural network to generate output labels that indicate probabilities of potential leakage pathways of carbon dioxide storage of the first subsurface.

2. The apparatus of claim 1, wherein the synthetic data incorporates linear transformations.

3. The apparatus of claim 1, where the training is performed on a first group of neural networks including the first neural network and at least one additional neural network.

4. The apparatus of claim 3, wherein the training of the first group of neural networks also provides uncertainty estimations for the output labels.

5. The apparatus of claim 4, wherein at least one neural network in the first group of neural networks is trained using a dropout layer.

6. The apparatus of claim 3, wherein the training incorporates ensemble learning.

7. The apparatus of claim 6, wherein the ensemble learning includes combining results of each of the neural networks in the first group of neural networks.

8. The apparatus of claim 3, wherein the first neural network includes a first model, and wherein the at least one additional neural network includes a second neural network that includes a second model that is different from the first model.

9. The apparatus of claim 8, wherein the at least one additional neural network further includes a third neural network and a fourth neural network, wherein the third neural network is trained based on the first model and using dropout relative to the first neural network, and wherein the fourth neural network is trained based on the second model and using dropout relative to the second neural network.

10. A method, comprising:
via at least one processor, training at least one neural network with synthetic data, wherein the synthetic data includes seismic images of synthetic simulated subsurfaces, at least a first neural network of the at least one neural network extracts features from multiple resolutions of the seismic images of the synthetic simulated subsurfaces, and wherein the training is also accomplished with a ground truth that includes synthetic labels that are associated with probabilities of potential carbon dioxide leakage pathways of the synthetic simulated subsurfaces, and wherein the synthetic data includes simulated elastic deformations of the potential carbon dioxide leakage pathways of the synthetic simulated subsurfaces;
receiving a seismic image of a first subsurface; and
using the at least one neural network to provide output labels that are associated with probabilities of potential carbon dioxide leakage pathways of the first subsurface.

11. The method of claim 10, wherein the synthetic data incorporates linear transformations.

12. The method of claim 10, wherein the at least one neural network further includes at least one additional neural network, and wherein the training incorporates ensemble learning.

13. The method of claim 12, wherein the first neural network includes a first model, and wherein the at least one additional neural network includes a second neural network that includes a second model that is different from the first model.

14. The method of claim 12, wherein at least one neural network among the at least one neural network is trained using a dropout layer.

15. The method of claim 12, further comprising training the at least one neural network to provide uncertainty estimations of the output labels.

16. A processor-readable storage medium, having stored thereon processor-executable code that, upon execution by at least one processor, enables actions, comprising:
performing training of a first neural network with synthetic data that is associated with images of synthetic simulated subsurfaces, wherein the first neural network extracts features from multiple resolutions of the images of the synthetic simulated subsurfaces, with ground truth including synthetic labels that indicate probabilities of potential carbon dioxide leakage pathways of the synthetic simulated subsurfaces, and wherein the synthetic data includes simulated elastic deformations of the potential carbon dioxide leakage pathways of the synthetic simulated subsurfaces; and providing output labels from an image of a first subsurface via at least the first neural network, such that the output labels indicate probabilities of potential leakage pathways of carbon dioxide storage of the first subsurface.

17. The processor-readable storage medium of claim 16, wherein the synthetic data incorporates linear transformations.

18. The processor-readable storage medium of claim 16, wherein the training is performed on a first group of neural networks including the first neural network and at least one additional neural network, and wherein the training incorporates ensemble learning.

19. The processor-readable storage medium of claim 18, further comprising training the first group of neural networks to provide uncertainty estimations of the output labels.

\* \* \* \* \*